United States Patent [19]
Blanz et al.

[11] Patent Number: 5,255,216
[45] Date of Patent: Oct. 19, 1993

[54] REDUCED HARDWARE LOOK UP TABLE MULTIPLIER

[75] Inventors: Wolf-Ekkehard Blanz; Charles E. Cox, both of San Jose, Calif.

[73] Assignee: International Business Machines Corporation, Armonk, N.Y.

[21] Appl. No.: 746,385

[22] Filed: Aug. 16, 1991

[51] Int. Cl.$^5$ .............................................. G06F 7/52
[52] U.S. Cl. .................................... 364/757; 364/754
[58] Field of Search .................. 364/757, 754, 724.16, 364/724.01

[56] References Cited
U.S. PATENT DOCUMENTS

| | | | |
|---|---|---|---|
| 4,313,174 | 1/1982 | White | 364/753 |
| 4,345,316 | 8/1982 | Hirotani et al. | 364/900 |
| 4,566,075 | 1/1986 | Guttag | 364/754 |
| 4,573,136 | 2/1986 | Rossiter | 364/757 X |
| 4,679,164 | 7/1987 | Rearick | 364/754 X |
| 4,709,343 | 11/1987 | Van Cang | 364/724.01 |
| 4,782,458 | 11/1988 | Bhattacharya et al. | 364/724.16 |
| 4,825,401 | 4/1989 | Ikumi | 364/760 |
| 4,868,778 | 9/1989 | Disbrow | 364/757 |
| 5,117,385 | 5/1992 | Gee | 364/757 |

OTHER PUBLICATIONS

Exerpt 6.10 ROM-Adder Multiplication Networks from 6 Iterative Cellular Array Multipliers, pp. 201-207.

Primary Examiner—Tan V. Mai

[57] ABSTRACT

A method and apparatus for multiplying an N bit number X(t) by an M bit number O, and a method for making such an apparatus for multiplying numbers are described. The N bit number is partitioned into K non-overlapping bit groups having priorities ranging from 0, which corresponds to the least significant bits in the value X(t), to K−1, which corresponds to the most significant bits in the value X(t). Each bit group functions as an address which accesses a first value in a respective Look Up Table (LUT). The values from the respective LUTs represent a sum of a constant, which is different for different LUTs, and the product of C and the binary value of the bit group to which the LUT corresponds. The values of the LUTs are added together, effectively bit shifted in accordance with their relative priorities, to form a partial product. The process is repeated with the remaining bit groups of X(t) in their order of priority, highest to lowest. An adder partial products until a single result is obtained. The single result is the (N+M) bit product of C and X(t). the correct result for this product is obtained from the adder tree because the individual constants added to the LUTs, which correspond to the bit groups, compensate the final result for the effects of the effective bit shifting and adding operations.

16 Claims, 8 Drawing Sheets

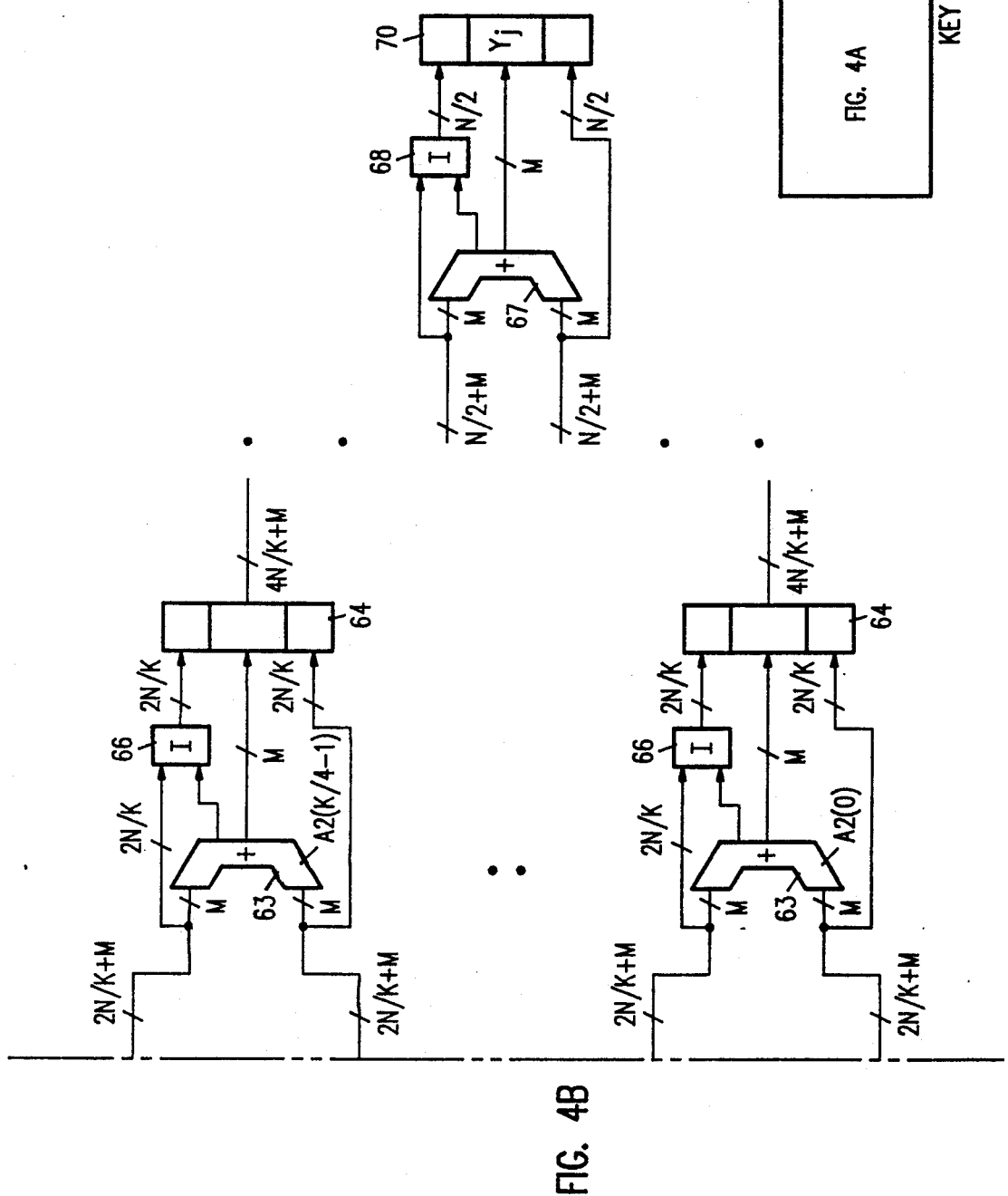

KEY TO FIG. 5

REDUCED HARDWARE LOOK UP TABLE MULTIPLIER

FIELD OF THE INVENTION

This invention relates generally to the field of digital computers and data processing systems. More specifically, the invention relates to a calculating computer for use in multiplier applications. In particular, the invention relates to a method for multiplying two operands which reduces the complexity and quantity of the electronic circuits necessary to carry out the operation.

BACKGROUND OF THE INVENTION

The task of multiplying a variable by a loadable constant is required by a large number of computer applications. Two such applications, among others, are digital signal processing and the implementation of a neural network. In both cases, the application is characterized by a high number of multiplications of a variable by a constant. Whether the variable is received from neural nodes or is a time sampled signal, the same type of mathematical operation is required. The present invention is a technique for carrying out the basic task of multiplying a variable by a constant for these types of applications. This technique and its advantages are applicable to any computer operation requiring a multiplication operation. The technique is especially applicable to digital filters and neural networks because of the large number of repetitive multiplication operations that take place in those applications. The technique described below is described in the context of a digital filter for illustrative purposes even though it is understood that the technique is applicable to other computer applications.

Digital filtering is a technique for analyzing and modifying an analog signal. This technique is implemented by a multi-stage apparatus in which the jth stage generates a product produced by multiplying the instantaneous value of a filter input $X(t)$ and a filter stage coefficient $Cj$. For example, a digital finite impulse response (FIR) filter is represented by:

$$\text{Equation (1):} \quad Y(t) = \sum_{i=0}^{j} (Ci \times X(t))$$

Equation (1) represents a FIR filter with constant coefficients. The apparatus which implements the filter of equation (1) consists of a number of stages. At each stage, the ith coefficient $Ci$ is multiplied by the magnitude of the input signal $X(t)$ to produce a product. $Y(t)$ is obtained by taking the sum of all the $J+1$ stage products. A conventional architecture for the FIR filter of equation (1) is represented by the apparatus of FIG. 1. In FIG. 1, $X(t)$ is multiplied by coefficient $Cj$ in multiplier 10 and the product $Yj$ is stored in register $Rj$. The product $Yj$ is added to the product of $C(j-1)$ and $X(t)$ in adder 15, and stored as intermediate result $Y(j-1)$. The intermediate results are then added and stored to successive products of $Ci$ ($i=j$ to 0) and $X(t)$ until $i=0$. $Y(t)$ is the sum of the intermediate results and $Ci$ multiplied by $X(t)$.

The effectiveness of the digital filter depends on the speed with which $Y(t)$ can be computed. The sampled and modified signal $Y(t)$ should be as close to the corresponding $X(t)$ in time as possible. If calculating $Y(t)$ is slow, then the number of stages is reduced so that $Y(t)$ can be computed faster, and as a result, $X(t)$ more nearly corresponds to $Y(t)$ in the time domain. However, reducing the number of stages, reduces the accuracy in modifying $X(t)$. That is, there are fewer stages and therefore less accuracy in determining the magnitude of $Y(t)$. Therefore, making the calculation of $Y(t)$ faster, increases the accuracy of the output because more stages can be included for the same amount of processing time.

A significant factor in the speed with which $Y(t)$ is determined is the speed of the multiplier in the digital filter. A high speed binary multiplier accepts any two operands and generates the product of the operands. Typically, these multipliers are much slower than adders because they shift and add for each bit of $Ci$ and this generally requires several clock cycles of the computer to complete a single multiplication function. Even the use of special algorithms to reduce the number of bits being shifted and added, such as Booths Algorithm, do not make such multipliers fast enough for many digital filter applications in which speed and accuracy are required.

A solution to this problem has been to replace the general multiplier with a Look Up Table (LUT) which provides the function of the multiplier in the digital filter environment. The LUT has stored all the possible products of $X(t)$ and a single coefficient $Cj$. This is possible because $X(t)$ is represented by a finite number of bits which means there can only be a finite number of values for $X(t)$. The product of each of the finite number of values and $Cj$ are arranged in the LUT such that the value of $X(t)$ is the address in the LUT of the product of $X(t)$ and $Cj$. There is a LUT for each $Ci$ ($i=0$ to $j$), just as there would be a multiplier for each stage of the digital filter. When $X(t)$ addresses the various LUTs, the corresponding products are output to the adders 15 of the digital filter. The use of the LUT is much faster than the multiplier because an address and retrieve operation is faster than multiple shift and add operations. This results in a faster digital filter. The use of the LUT is practical in a digital filter because $Cj$ is constant (or changes infrequently) and therefore the products are just reused and only have to be generated once (or infrequently). The problem with this solution to the speed problem of the digital filter is that LUTs are much larger than multipliers. The multiplication of an N bit $X(t)$ by an M bit $Cj$, results in an (N+M) bit product. Since there are $2^N$ possibilities for $X(t)$, this results in $2^N \times (N+M)$ bits of storage necessary for each LUT. A typical $8 \times 8$ bit multiplication requires 4,096 bits of storage for one LUT. Such storage requirements are very expensive compared to the remaining circuitry which makes up the rest of the digital filter.

OBJECTS OF THE INVENTION

It is an object of the present invention to improve the method of multiplying in a data processing system.

It is a further object of the present invention to improve the method of multiplying a variable by a constant in a data processing system.

It is another object of the present invention to decrease the cost of a multiplier in a data processing system.

It is still a further object of the present invention to decrease the size of a multiplier in a data processing system.

SUMMARY OF THE INVENTION

This invention is a method and apparatus for multiplying an N bit number $X(t)$ by an M bit number C. This invention also includes a method of making a multiplier using the method of multiplying numbers described. This invention for multiplying two numbers partitions the N bit number into K non-overlapping bit groups. The bit groups have a priority ranging from 0, which corresponds to the least significant bits in the value $X(t)$, to $K-1$, which corresponds to the most significant bits in the value $X(t)$. Each bit group functions as an address which accesses a first value in a Look Up Table (LUT). There is a single LUT which corresponds to each bit group. Each bit group produces a value from the LUT which has the priority of the bit group to which the value corresponds. The values from the LUT represent a sum of a constant, which is different for each of the different LUTs, and the product of C and the binary value of the bit group to which the LUT corresponds. The value has $((N/K)+M)$ bits because the product of an N/K bit number and an M bit number is $((N/K)+M)$ bits. The lowest order $(N/K)$ bits of the low order LUT form the low order $(N/K)$ bits of the $((2N/K)+M)$ bit result. The next priority M bits of the result are from the addition of M bits from the low order LUT and M bits from the high order LUT. The $(N/K)$ upper bits of the result are from the $(N/K)$ high order bits of the upper LUT. The upper $(N/K)$ order bits are incremented from the carry out bit of the M bit adder.

The process of accessing a pair of values corresponding to a higher and lower priority bit group and forming a $((2N/K+M)$ result is repeated with the remaining bit groups of $X(t)$ in their order of priority, highest to lowest. The results of the multiple K/2 additions are then sent to an adder tree which successively adds higher priority adder results to lower priority adder results until a single result is obtained. The single result is the $(N+M)$ bit product of C and $X(t)$. The correct result for this product is obtained from the adder tree because the individual constants added to the LUTs, which correspond to the bit groups, compensate the final result for the effects of the incrementing the higher priority bits and adding less than the entire result of the LUTs.

PREFERRED EMBODIMENT

Figure 1:
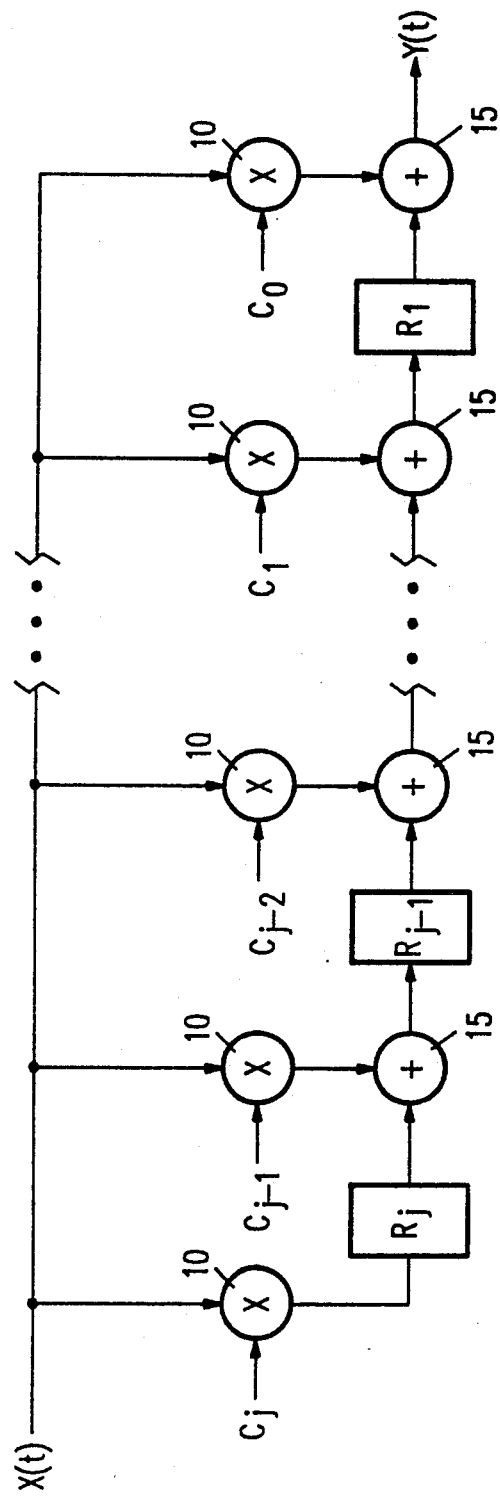
FIG. 1 illustrates a conventional digital filter architecture employing multipliers shown in block diagram form.
Figure 2:
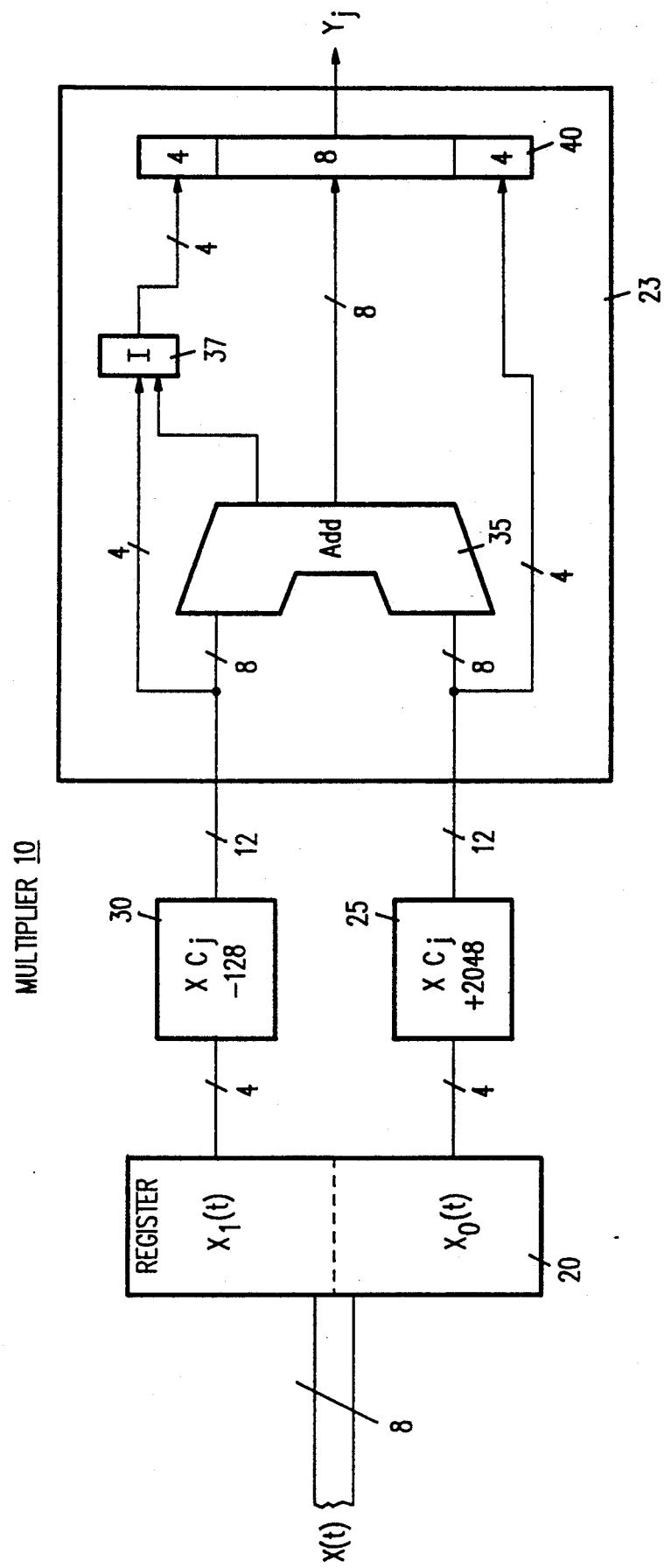
FIG. 2 illustrates a multiplier for multiplying two eight bit numbers according to the present invention.

A first embodiment of the present invention is illustrated in FIG. 2 for the specific example of multiplying an 8 bit variable by an 8 bit constant in multiplier 10. In particular, $X(t)$ has 8 bits which are temporarily stored in register 20. The constant is $Cj$. The register 20 is divided into two parts. An upper part X1 contains the 4 most significant bits of $X(t)$, and a lower part X0 contains the 4 least significant bits of $X(t)$, X1 is used as an address of Look Up Table (LUT) 30, which contains the 16 possible ($2^4$) results of $((Cj \times X1) - 128)$. The 16 possible results from LUT 30 are 12 bits wide. The 12 bit result addressed by X1 is broken into two parts. The low order 8 bits are sent to the Adder 35. Adder 35 adds the low order 8 bits from LUT 30 to the high order 8 bits from LUT 25 which is addressed by X0. The output of LUT 25 is always positive, and therefore, unsigned. The output of LUT 30 is possibly negative, and therefore, signed. The 8 bit result of Adder 35 is sent to the output 40 as the middle order 8 bits of the final result $Yj$.

When the Adder 35 gets an overflow bit from the addition of the two 8 bit numbers, that overflow bit is sent to increment means 37. Increment means 37 adds the overflow bit to the 4 high order bits from LUT 30. The resulting four bits of the increment means 37 are sent to the output 40 as the high order 4 bits of the result. X0 is also used as an address to an LUT 25 in a similar manner to X1. The LUT 25 contains the 16 possible results of $((Cj \times X0) + 2048)$. The 16 possible results are 12 bits wide. The 12 bit result addressed by X0 is broken into two parts. The low order 4 bits are sent directly to the output 40 as the low order 4 bits ($Yj_0-Yj_3$) of the result. The next 8 higher order LUT 30 as described above.

Figure 3:
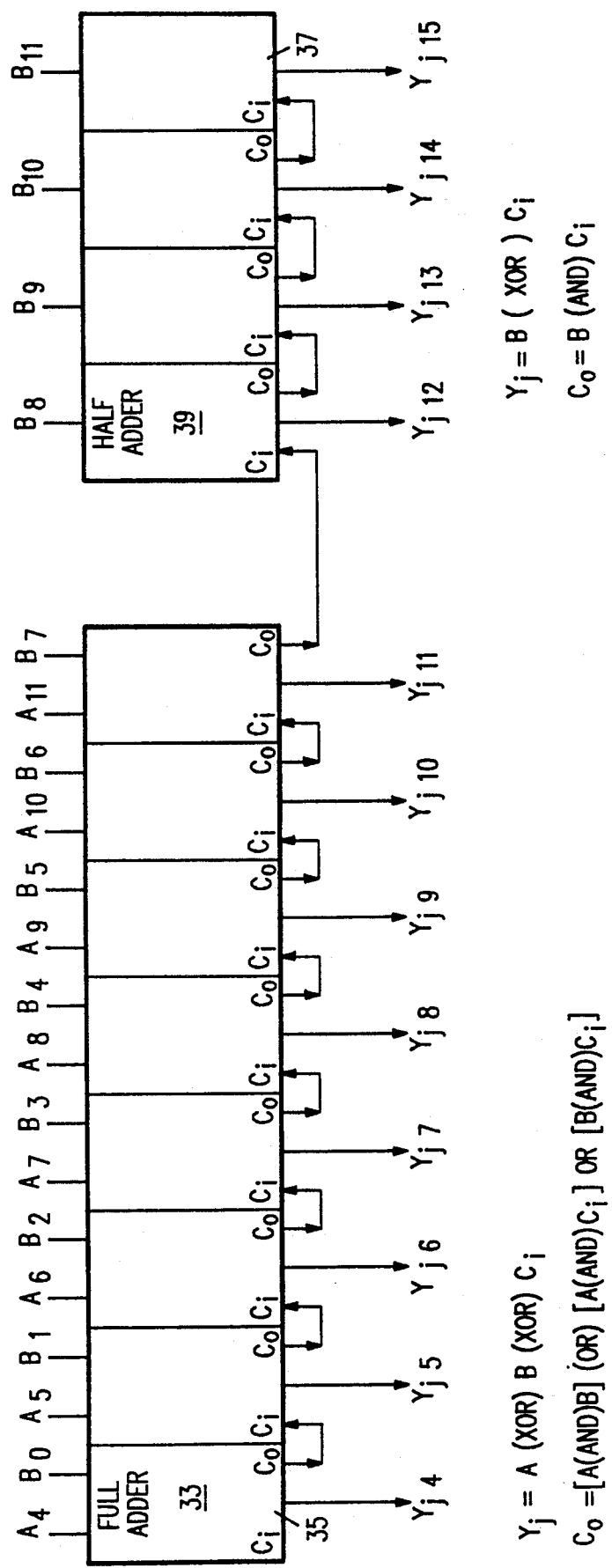
FIG. 3 illustrates an adding means according to the present invention.

FIG. 3 further illustrates the Adder 35 and increment means 37. Adder 35 is comprised of 8 full adder cells 33. Each full adder cell 33 has three input bits and two output bits. One input bit is a carry in bit Ci, and one output bit is a carry out bit Co. The other two input bits are the bits from the two values to be added. Specifically, denominating the output of LUT 25 as A, and the output of LUT 30 as B, bit 4 of A is added with bit 0 of B, to produce bit 4 of the result $Yj$. The carry out from this first full adder cell is added to bit 5 of A and bit 1 of B, to produce bit 5 of $Yj$. This process continues for bits 6-11 of the output $Yj$. Each full adder cell 33 has a one bit output $Yj = A(XOR)B(XOR)Ci$ and carry out bit $Co = (A(AND)B)(OR)(A(AND)Ci)(OR)(B(AND)Ci)$. Bits $Yj_4$ through $Yj_{11}$ form the 8 middle order bits of the result $Yj$.

The carry out bit for the adder cell of bit 11 of $Yj$ is then sent to the carry in bit of the first cell of the increment means 37. The increment means 37 is comprised of 4 half adder cells 39. Each half adder cell adds a carry in bit to a bit from B to produce an output bit. The carry out bit for the full adder cell of bit 11 of $Yj$ is added to bit 8 of B to produce an output bit of $Yj$. The first output bit of increment means 37 is bit 12 of the result $Yj$. The carry out bit of $Yj_{12}$ is sent to the carry in bit of $Yj_{13}$ and is added to $B_9$ to produce $Yj_{13}$. The output bit of the half adder cell is $B(XOR)Ci$, and the carry out bit is $B(AND)Ci$. The increment means 37 produces the upper 4 bits ($Yj_{12}-Yj_{15}$) of the result $Yj$. The interconnection of the adder 35, the increment means 37, and the output register 40 form the add/increment (A/I) means 23 illustrated in FIG. 2. Bits $Yj_0$ through $Yj_{15}$ form the 16 bit result of $(X(t) \times Cj)$.

The operation of the multiplier 10 assumes that the variable $X(t)$ is an eight bit signed number as is the constant $Cj$. The variable can be broken up into two parts, X0 and X1. X0 and X1 each have four bits. The expression $(X(t) \times Cj)$ can now be expressed as a sum of partial products $((XO \times Cj) + ((2^4) \times X1 \times Cj))$. The lower partial product is $(XO \times Cj)$ and the upper partial product is $(X1 \times Cj)$. Both of the partial products are signed because Cj is signed. A signed number uses the most significant bit position to denote the sign of the number. Each of the partial products are 12 bits wide, when the sign extension of the lower partial product, and the four shifted bits of the upper partial product, are ignored for the time being. Therefore, the LUT size is $((2^4) \times 12) = 192$ bits, and the total storage required is 384 bits for the two LUTs of the multiplier 10. This should be compared to an LUT size of 4,096 bits $(2^8 \times 16)$ in a conventional LUT approach for an eight by eight bit multiplier. Subdividing the variable into two parts and implementing the LUT in two parts reduces the area consumed by the storage by a factor of approximately ten for the cost of an additional adder.

The ability to simply add two signed 12 bit partial products and obtain the signed 16 bit result depends on the manner in which the sign extension of the partial products is accomplished. The sign extension of the lower partial product, and its results on the complexity of the adder, can be completely avoided by ensuring that the lower partial product is always non-negative. In this example, a signed 12 bit number ranges from $(-2^{11})$ to $(2^{11}) - 1$. Adding $(2^{11})$ to the lower partial produce ensures that the lower partial product will always be non-negative. Adding $(2^{11})$ to the lower partial product does not create an overflow condition for the 12 bit result as long as the result is considered to be an unsigned number (that is, always positive). Therefore the 12 bit lower partial product result ranges from 0 to $(2^{12}) - 1$.

Although both the lower and upper partial products physically use 12 bits, they represent 16 bit numbers. This is possible because due to the priority of XO and X1. The upper partial product is 12 bits which are effectively shifted by 4 bits (to make a 16 bit representation) due to the multiplication of $2^4$ times the upper partial product. These low order 4 bits are always zero so there is no need to carry them in hardware. This means they also do not have to be physically added to the low order 4 bits of the lower partial product. Therefore, the 4 low order bits of the lower partial product are just sent directly to the output Yj. Similarly, the lower partial product can be thought of as 12 bits with 4 zeros (to represent a 16 bit number) appended to the most significant bits of the lower partial product. Since zeros appended to the most significant bits are meaningless, there is no need to carry them in hardware. Also, since zeros do not have to be physically added, the only adding to the 4 high order bits of the upper partial product is from the carry out bit of the 8 bit adder which is performed with the incrementer means 37.

In order to accomplish adding $(2^{11})$ to the lower partial product, $(2^{11})$ must be subtracted from the upper partial product. This condition is expressed as follows:
Equation (2)

$$X(t) = ((XO \times Cj) + (2^{11})) + (((2^4) \times X1 \times Cj) - (2^{11}))).$$

Note that the subtraction of $((2^{11}))$ does not affect the least significant four bits of the upper partial product because the least significant four bits of both $2^{11}$ and the upper partial product are all zeros. Additionally, $X(t)$ is still signed even though the lower partial product is positive. This is because the upper partial product is signed. Equation (2) can be rearranged as follows:
Equation (3)

$$X = (t) = (((XO \times Cj) + (2^{11})) + (((X1 \times Cj) - (2^7)) \times (2^4))).$$

Subtracting $(2^7) = 128$ from the upper partial product in combination with shifting the upper partial product four bits compensates for the addition of $(2^{11})$ to the lower partial product. Adding $(2^{11})$ to the lower partial product and subtracting $(2^{11})$ from the upper partial product, in turn, eliminates the need for sign extension on the lower partial product. This allows the lower partial product to be treated as an unsigned number even though $X(t)$ is still signed. Therefore the adder circuitry is simplified. The values subtracted from the upper and lower partial products are put into the LUTs 30 and 25 respectively. This allows an 8 bit adder and incrementing means to take the place of a conventional 16 bit adder.

A second embodiment of the present invention is illustrated in FIG. 4 for the more general example of multiplying an N bit variable $X(t)$, by an M bit constant Cj. $X(t)$ is partitioned into K non-overlapping bit groups. In this second embodiment, N and K are even numbers such that N is evenly divisible by K. K, in turn, i.e. equal to $2^L$, where L is an integer greater than zero. $X(t)$ is stored in register 50 and partitioned into K bit groups, $X(O)$ through $X(k-1)$. Each bit group contains $N/K$ bits. Each bit group addresses one of K LUTs. When the bit group is odd, that is $X(k-1)$, $X(k-3)$, ... $X(1)$, the bit group addresses an LUT 52 containing an $((N/K) + M)$ bit upper partial product result. When the bit group is even, that is $X(k-2)$, $X(k-4) \ldots X(2)$, $X(0)$, the bit group addresses an LUT 54 containing a $((N/K) + M)$ bit lower partial product result. Each upper partial product result is effectively shifted $N/K$ bits higher in priority with respect to the preceding lower partial product. The lower M bits of each upper partial product and the upper M bits of the preceding lower partial product are sent to an adder 60.

The adder 60 produces an M bit result and a carry out bit. The carry out bit is added to the upper $N/K$ bits of the upper partial products in increment means 56. The result of the first stage adder 60 is placed in register 58. The highest order $N/K$ bits in register 58 are from increment means 56. The next highest order M bits in register 58 are from the first stage adder 60. The lowest order $N/K$ bits in register 58 are from the low order $N/K$ bits of the lower partial product. Register 58 contains an $(M + 2N/K)$ bit result. Each of the first stage adders 60 adds first and second M bit results from LUTs 52 and 54 which are addressed through adjacent even and odd bit groups of $X(t)$. The odd bit group addresses the upper partial product result and the even bit group addresses the lower partial product result. There are $K/2$ first stage adders denominated $Al(k/2-1)$, $Al(k/2-2)$, ... $Al(1)$, $Al(0)$. $Al(k/2-1)$ is assigned to the highest order bit groups $X(k-1)$ and $X(k-2)$. There is one first state 60 for each pair of odd and even bit groups in $X(t)$.

When the first stage adder 60 is odd, that is $Al(k/2-1)$, $Al(k/2-3)$, etc., the $(2N/K+M)$ bit output of the register 58 is used as an upper partial product for the second stage adder 63. When the first stage adder 60 is even, that is $Al(k/2-2)$, $Al(k/2-4)$, etc., the $(2N/K+M)$ bit output of the register 58 is used as a lower partial product for the second stage adder 63. The second stage adder 63 is an M bit adder which outputs M bits to register 64. The carry out bit of the second stage adder is added to the upper 2N/K bits of the second stage upper partial product in increment means 66. The output of increment means 66 forms the highest priority 2N/K bits of register 64. The next lower priority M bits are from second stage adder 63. The lowest priority 2N/K bits in register 64 are the lowest priority 2N/K bits from the second stage lower partial product Register 64 contains a (4N/K+M) bit result.

The outputs of adjacent odd and even first stage adders form the inputs to the second stage adders. The second stage adders have priority A2(k/4−1), A2(k/4−2), etc., in a similar manner to the first stage adders. When the second stage adder is odd, that is A2(k/4−1), A2(k/4−3), etc., the output of register 64 is used as an upper partial product for a third stage adder. When the second stage adder is even, that is A2(k/4−2), A2(k/4−4), etc., the output of register 64 is used as a lower partial product for a third stage adder. The outputs of the third stage register are subsequently used for the inputs to a fourth stage of adders and so on. This continues until the outputs of a register associated with an adder stage has (N/2+M) bits. At this point there will be two registers having (N/2+M) bits and both of these are used as inputs to final adder stage 67. Final adder stage 67 adds M bits from each of the registers and passes the result to output register 70. The upper N/2 bits of register 70 come from increment means 68, and the lower N/2 bits of register 70 come directly from the final adder stage lower partial product. The output register 70 holds an N+M bit result Yj which is the product of Cj and X(t).

The addition of upper and lower partial products in successive adder stages, which are arranged in an adder tree as described above, to form the product of Cj and X(t) depends on the manner in which the sign extension of the partial products is accomplished. In particular this invention avoids sign extension for all partial products of the first stage adders except the highest priority bit group of X(t). As in the first embodiment, constants are added to the product of Cj and the address bit group for each LUT. The LUTs 54 which correspond to the even bit groups contain the product of bit group (i.e., X(k−2) and Cj plus a constant S(2I) which is b $2^{(((N/K)+M)-1)}$. The constant S(2i) (i=0 to ((k/2)−1)) guarantees that the output of the LUT 54 is a positive number, as in the first embodiment of the invention, and so can be treated as an unsigned number.

The LUTs 52 which correspond to the odd bit groups, except the LUT corresponding to the X(k−1) bit group, also contain the product of the bit group (i.e X(3)) and Cj plus a constant S(2i+1) (i=0 to (k/2)−2)). The constant S(2i+1) is equal to:
Equation (4)

$$S(2i+1) = (2^{(((N/K)+M)-1)}) - (2^{(M-1)}).$$

This is because the constant added to the LUT 52 must ensure that the outputs of the first adder stages are non-negative. The output at each first stage adder can itself be considered a partial product in which the multiplication has been broken into K/2 parts, giving 2N/K bits per part. The multiplication of an M bit constant and a 2N/K bit part, provides a ((2N/K)+M) bit result. Following the same technique used on the even bit groups, this would mean adding $2^{(((2N/K)+M)-1)}$ to the LUT 52 (except the adder having the LUT 52 corresponding to X(k−1). However, each first stage adder output already has X(k−1))). However, each first stage adder output already has $S(2i) = 2^{(((N/K)+M)-1)}$ added to it. Furthermore, each output of the LUT 52 has been effectively shifted N/K bits to the most significant bit (i.e., left). This means that the constant added to each product of an odd bit group and the constant Cj, is:
Equation (5)

$$S(2i+1) = (2^{(((2N/K)+M)-1)} - 2^{((N/K)+M)-1)})/2^{(N/K)}$$

which reduces to equation (4). In sum at each odd LUT 52 (except the one corresponding to the bit group X(k−1)), the product of an N/K bit unsigned number (X(2i+1)) and an M bit signed constant is generated. That product is added to an ((N/K)+M) bit unsigned number (S(2i+1)) to generate the LUT 52 output which becomes the first state upper partial product.

S(2I+1) (i=k/2−1) is the constant added to the product of the bit group X(k−1) and Cj in the LUT 52 corresponding to the bit group X(k−1). S(k−1) has been treated differently than the rest of S(2I+1) and S(2i) because those constants were all additions to the partial products. In order to compensate for these additions, S(k−1) must be a negative number. The effect of S(k−1) is different than the other constants added to the LUTs because the result of the LUT associated with X(k−1) may be a signed number. Carrying this signed number through the L adder stages gives the final result Yj its sign.

The magnitude of S(k−1) is the sum of all the additions to the odd and even LUTs, as those additions affected the partial products. At each first stage adder, the result contained ((2N/K)+M) bits, and so a constant equal to S(2i) S(2I+1)=$2^{(((2N/K)+M)-1)}$ was added to ensure that each result was positive (i.e., unsigned). However the priority of the adder (i.e., Al(0, 1, ... K/2)) determines the magnitude of the constant that was actually added to the sum. In particular, all but the lowest adder stage had its constant shifted by 2N/K bits with respect to the next lowest priority adder. Therefore, a geometric series is used to compute the effective sum of all the constants. This series is:

Equation (6):
$$a + aq + aq^2 + aq^3 + \ldots + aq^{(p-1)} = a(q^p - 1)/(q1)$$

The series has base (a)=$2^{(((2N/K)+M)-1)}$, factor (q)=$2^{(2N/K)}$, and (p)=(K/2)−1 elements. this analysis however does not consider the constants added to the highest priority (i.e., Al(k/2)) first stage adder. In particular it does not consider the constant S(ki−2)=$2^{(((N/K)+M)-1)}$ added to the LUT 54 corresponding to the bit group X(k−2). The effective result of this constant on the adder is S(k−2) × $2^{(N-2N/K)}$ because of the (k−2) bit group position of X(k−2) and shifting (k−2) bit groups is effectively multiplying by (k−2)N/K=N−2N/K. Therefore, the result of equation (6) is added to the effective result of S(k−2), to obtain S(k−1), which results in:

Equation (7):
$$S(k - 1) = -(2^{(((3N/K)+M-N)-1)} \times$$

-continued
$$((2^{(N-(2N/K))} - 1)/(2^{(2N/K)} - 1))) - (2^{(M-1)}).$$

FIG. 5 illustrates the extension of the present invention to the situation where K is not equal to $2^L$ or N/K is not an integer. In this situation, the higher priority (K−1) bit groups having (D/(K−1)) bits are treated as in FIG. 4 and the second embodiment of the present invention. The total number of bits N of X(t) is equal to D+E, where D is divisible (as a whole number) by the number of bits in a bit group. The lowest priority bit group X(0) contains E bits, where E is different than (D/(K−1)). The value of X(0) is an address to LUT 55 which produces an (E+M) bit result. This result is the sum of a constant S(0) added to the product of Cj multiplied by X(0).

The constant added to the even LUTs 52 (except for X(K−1)) is S(2i) for (i−1 to (((K−1)/2)−1) and is equal to:

$$S(2i) = (2^{(((D/(K-1))+M)-1)}) - (2^{(M-1)}).$$

The constant added to the odd LUTs 54 is S(2i+1) for (i=0 to ((K−1)/2)−1)) and is equal to:

$$S(2i+1) = (2^{(((D/(K-1))+M)-1)}).$$

The constant added to the highest priority LUT is S(K−1) and is equal to:

$$S(K-1) = -(2^{(M-((D*(K-2))/(K-1))-1)} + 2^{(M-1)} + (2^{(M-((D*(K-4))/(K-1))-1)} * ((2^{(((D*(K-3))/(K-1))-1)})/(2^{(((2*D)/(K-1))-1)}))).$$

(* Denotes multiplication).

The constant S(0) added to LUT 55 is equal to $(2^{((E+M)-1)})$.

The result of LUT 55 is an input to adder 69 and output register 78. The lowest E bits of LUT 55 are placed in the lowest priority positions of register 78. The highest priority M bits of LUT 55 are one input of final adder 69. The second input to the final adder 78 is the output of register 70 associated with the last adder 67 of the adder tree. This output is ((D/K)+M) bits. The lowest priority M bits of the output register 70 form the second input to the final adder 69. The highest priority (D/K) bits are added to the carry out bit of the adder 69 in increment means 74. The output of the increment means 74 forms the highest priority D/K bits of the output Yj in register 78. The next highest priority M bits of Yj are from the final adder 69, and the lowest priority E bits come from the output of LUT 55.

The multiplier 10 of the present invention consists of K LUTs, and an adder tree. The size of the multiplier 10 is primarily determined by the LUTs and the adders. In the general implementation of this multiplication method, there will be K LUTs and K−1 adders in the adder tree. The total storage size required will be K((N/K)+M) $(2^{(N/K)}) = (2^{N/K})(N+(KM))$ bit. Therefore the size of the multiplier, when fabricated on a single integrated circuit chip, will be determined by the number of bit groups, K, that the N bit variable is partitioned into.

General fabrication of integrated circuits on a single chip or die is well known in the art. The particular fabrication technique used to manufacture an integrated circuit will determine the actual physical parameters of the circuit. For example, the use of CMOS (Complementary Metal Oxide Semiconductor) technology will result in a smaller size per bit of storage on the chip than would the same circuit fabricated in other types (for instance Bipolar) of fabrication technologies. Similarly, fabricating the circuit in a Bipolar technology may make the circuit faster than the CMOS implementation, even though larger. However, the use of the above multiplication technique optimizes the space required for implementing the multiplier with respect to any particular fabrication technology.

The multiplication technique minimizes the size of the multiplier because K is chosen to efficiently use the space of a particular fabrication technology and design technique. For example, the method of multiplication of the present invention is particularly suited for fabrication in CMOS logic cell array technology. Logic cell arrays are integrated circuits fabricated in a specific technology having a number of rows and columns of configurable logic blocks. Each configurable logic block contains a 32 bit look up table and two flip flops. The look up tables can be configured to implement either a single arbitrary function of five variables, or two independent functions of four variables. Therefore, N/K is chosen as four so that two of the ((N/K)+M) bits of the output of the LUT in the multiplier are determined with one logic block. In the eight bit by eight bit multiplication of the first embodiment, the LUTs 35 and 40 are implemented in 12 logic blocks.

The considerable reduction in space required to implement the multiplier achieved as a result of choosing an optimum value of K for the logic cell array design technique is also applicable to full custom design techniques. This is because the choice of K not only determines the number of bits of storage but also the number of adders required. The number of adders is approximately K−1 because the bit groups are added through an adder tree. Therefore, K is chosen such that the sum of the adder sizes plus the total size of $(2^{(N/K)})+(N+(KM))$ bits of storage is less than $((2^N)(N+M))$ bits of storage.

While this invention has been particularly described and illustrated with reference to several preferred embodiments thereof, it will be understood by those skilled in the art that changes in the above description or illustrations may be made with respect to form or detail without departing from the spirit and scope of the invention.

What is claimed is:

1. A multiplier for multiplying an N bit number by an M bit number, comprising:

storage means for storing an N bit number, said storage means having first and second non-overlapping bit groups for holding, respectively, first and second bit groups values, each bit group having the same number of bits;

a first look up table (LUT) coupled to the first bit group, said first bit group accessing said first LUT to produce a first value, said first value representing a sum of a first compensation value added to a product of an M bit number multiplier by said first bit group value;

a second LUT coupled to the second bit group, said second bit group accessing said second LUT to produce a second value, said second value representing a sum of a second compensation value added to a product of said M bit number multiplied by said second bit group value;

adding means, comprising first adding means and an increment means, said first adding means adding a first plurality of bits from said first LUT to a first plurality of bits from said second LUT to produce a partial result;

said first adding means further producing a carry out bit, said carry out bit being added to a second plurality of bits from said first LUT by said increment means;

whereby said product of said N bit number and said M bit number is produced.

2. A multiplier, as in claim 1, wherein:
said first compensation value equals $-2^{(M-1)}$; and
said second compensation value equals $(2^{(N/2)+m-1})$.

3. A multiplier for multiplying an N bit number by an M bit number, comprising:

storage means for storing an N bit number, said storage means being partitioned into K non-overlapping bit groups, each of said K bit groups having the same number of bits, said bit groups having a priority corresponding to a significance value of said bits in said N bit number;

a first look up table (LUT) having storage space for less than $2^{(N+M)} \times (N+M)$ bits, said first LUT being coupled to a highest priority bit group, said highest priority bit group accessing said first LUT to produce a first value, said first value representing a sum of a first compensation value added to a product of an M bit number multiplied by said highest priority bit group which accesses said first LUT;

a first plurality of LUTs, each of said LUTs having storage space for less than $2^{(N+M)} \times (N+M)$ bits, each of said first plurality of LUTs being exclusively coupled to a respective one of said bit groups, each of said bit groups, accessing an LUT to produce a second value, each of said second values representing a sum of a second compensation value added to a product of an M bit number multiplied by said respective bit group;

a second plurality of LUTs, each of said LUTs having storage space for less than $2^{(N+M)} \times (N+M)$ bits, each of said second plurality of LUTs being exclusively coupled to a respective one of said bit groups, each of said bit groups accessing an LUT to produce a third value, each of said third values representing a sum of a third compensation value added to a product of an M bit number multiplied by said respective bit group; and an adder tree connected to the outputs of said first LUT, said first plurality of LUTs, and said second plurality of LUTs, said adder tree comprising (K−1) adding means.

each of said adding means comprising a first adding means and an increment means, said first adding means adding a first plurality of bits from a first input to a first plurality of bits from a second input to produce a partial result;

said first adding means further producing a carry out bit, said carry out bit being added to a second plurality of bits from said first input in said increment means;

each of said adding means forming an output;

whereby a product of said N bit number and said M bit number is produced.

4. A multiplier, as in claim 3, wherein:
K ≧ 4, and
K is a power of 2.

5. A multiplier, as in claim 4, wherein:
said first compensation value equals $$-(2^{(((3N/K)+M-N)-1)} \times ((2^{(N-(2N/K))}-1)/(2^{(2N/K)}-1))) - (2^{(M-1)});$$

said second compensation value equals $(2^{(((N/K)+M)-1)})$;

said third compensation value equals $(2^{(((N/K)+M)-1)}) - (2^{(M-1)})$.

6. A multiplier for multiplying an N bit number by an M bit number, comprising:

storage means for storing an N bit number, said storage means having K non-overlapping bit groups, wherein K−1 of said bit groups have the same number of bits, and a single bit group has a different number of bit from said K−1 bit groups;

said K−1 bit groups having a total of D bits, wherein D divided by K−1 is an integer;

said K bit groups having a total of D+E bits;

said K groups having a priority corresponding to a significance value of said bits in said N bit number, said single bit group having a priority less than said K−1 bit groups;

a first look up table (LUT) having storage space for less than $2^{(N+M)} \times (N+M)$ bits, said first LUT being coupled to a highest priority bit group, said highest priority bit group accessing said first LUT to produce a first value, said first value representing a sum of a first compensation value added to a product of an M bit number multiplied by said highest priority bit group which accesses said first LUT;

a first plurality of LUTs, each of said LUTs having storage space for less than $2^{(N+M)} \times (N+M)$ bits, each of said first plurality of LUTs being exclusively coupled to one of said bit groups, each of said bit groups accessing an LUT to produce a second value, each of said second values representing a sum of a second compensation value added to a product of an M bit number multiplied by said bit group which accesses said particular LUT;

a second plurality of LUTs, each of said LUTs having storage space for less than $2^{(N+M)} \times (N+M)$ bits, each of said second plurality of LUTs being exclusively coupled to one of said bit groups, each of said bit groups accessing an LUT to produce a third value, each of said third values representing a sum of a third compensation value added to a product of an M bit number multiplied by said bit group which accesses said particular LUT;

a second look up table (LUT) having storage space for less than $2^{(N+M)} \times (N+M)$ bits, said second LUT being coupled to a lowest priority bit group, said lowest priority bit group accessing said second LUT to produce a fourth value, said fourth value representing a sum of a fourth compensation value added to a product of an M bit number multiplied by said lowest priority bit group which accesses said second LUT;

an adder tree connected to said first LUT, said first plurality of LUTS, and said second plurality of LUTs, said adder tree receiving a first value from said first LUT, a plurality of second values from said first plurality of LUTs, and a plurality of third values from said second plurality of LUTS, said adder tree comprising (K−2) adding means arranged in L stages, wherein $2^L=(K-1)$, said adder tree forming a partial product of said N bit number and said M bit number, said partial product having D+M bits; and a final adding means connected to said adder tree and said second LUT, said final adding means receiving said adder tree partial product and said fourth value from said second LUT, each of said adding means comprising a first adding means and an increment means, first means adding a first plurality of bits from a first input to a first plurality of bits from a second input to produce a partial result, said first adding means further producing a carry out bit, said carry out bit being added to a second plurality of bits from said first input by said increment means;

each of said adding means forming an output;

whereby said product of said N bit number and said M bit number is produced.

7. A multiplier, as in claim 6, wherein:
said first compensation value equals $$-(2^{(M-((D*(K-2))/(K-1))-1)} + 2^{(M-1)} + (2^{(M-((D*(K-4))/(K-1))-1)} * ((2^{(((D*(K-3))/(K-1))-1)})/(2^{(((2*D)/(K-1))-1)})));$$

said second compensation value equals $$(2^{(((D/(K-1))+M-1)});$$

said third compensation value equals $$(2^{(((D/(K-1))+M)-1)}) - (2^{(M-1)});$$ and said fourth compensation value equals $2^{((E+M)-1)}$, wherein N=(D+E) and D/(K−1) is an integer.

8. A multiplier for multiplying an N bit number by M an bit number, comprising storage means for storing an N bit number, said storage means being partitioned into three non-overlapping bit groups, two of said three bit groups having the same number of bits, a single bit group having fewer bits than the two of said three bit groups, said bit groups having a priority corresponding to a significance value of said bits in said N bit number, said lowest priority bit group having fewer bits than two of said three bit groups;

a first took up table (LUT) having storage space for less than $2^{(N+M)} \times (N+M)$ bits, said first LUT being exclusively coupled to a highest priority bit group, said highest priority bit group accessing said first LUT to produce a first value, said first value representing a sum of a first compensation value added to a product of an M bit number multiplied by said highest priority bit group which accesses said first LUT;

a second LUT having storage space for less than $2^{(N+M)} \times (N+M)$ bits, said second LUT being exclusively coupled to a second bit group, said second bit group accessing said second LUT to produce a second value, said second value representing a sum of a second compensation value added to a product of an M bit number multiplied by said second bit group;

a third LUT having storage space for less than $2^{(N+M)} \times (N+M)$ bits, said third LUT being exclusively coupled to said bit group having the lowest priority, said lowest priority bit group accessing said third LUT to produce a third value, said third value representing a sum of a third compensation value added to a product of an M bit number multiplied by said lowest priority bit group which accesses said third LUT;

a first adding means connected to the outputs of said first and second LUTs, and a second adding means connected to the outputs of said first adding means and said third LUT, each of said first and second adding means comprising a third adding means and an increment means, said third adding means adding a first plurality of bits from a first input to a first plurality f bits from a second input to produce a partial result, said third adding means further producing a carry out bit, said carry out bit being added to a second plurality of bits from said first input by said increment means;

each of said first and second adding means forming an output;

whereby a product of said N bit number and said M bit number is produced.

9. A multiplier, as in claim 8, wherein:
said first compensation value equals $$-(((2^{(M-1)}+(2^{((D/2)+M-1)}))/(2^{(D/2)}));$$

and second compensation value equals $2^{(D/2+M-1)}$; and
said third compensation value equals $2^{(E+M-1)}$.

10. A method for multiplying an N bit by an M bit number to produce an (N+M) bit product, comprising:

partitioning said N bit number into two equal size, non-overlapping, bit groups;

accessing a first look up table (LUT) having storage space for less than $2^{((N+M)-1)} \times (N+M)$ bits by an address contained in a first bit group, said first LUT produces a first value which represents a sum of a first compensation value added to a product of said M bit number multiplied by said first bit group value;

accessing a second LUT having storage space for less than $2^{((N+M)-1)} \times (N+M)$ bits by an address contained in a second bit group, said second LUT produces a second value which represents a sum of a second compensation value added to a product of said M bit number multiplied by said second bit group value;

performing an add/increment function in which N/2 bits of said second value form a low order portion of said (N+M) bit product, M bits of said first and second values are added to form M bits of said (N+M) bit product having a higher priority than said low order portion of said (N+M) bit product, and N/2 bits of said first value are added with a carry out bit of said M bit addition to form a high order portion of said (N+M) bit product.

11. A method for multiplying an N bit number by an M bit number to produce an (N+M) bit product, as in claim 10, wherein:
said first and second LUTs have storage space for approximately $2(N/2) \times ((N/2)+M)$ bits.

12. A method for multiplying an N bit number by an M bit, number to produce an (N+M) bit product, as in claim 11, wherein:
said second compensation value equals $2^{(D/2+M-1)}$; and
said third compensation value equals $2^{(E+M-1)}$.

said second compensation value equals $(2^{((N/2)+M-1)})$.

13. A method for multiplying an N bit number of an M bit number to produce an (N+M) bit product, comprising the steps of:
   partitioning said N bit number into a plurality of non-overlapping respective bit groups, said bit groups having a priority corresponding to a significance value of said bits in said N bit number;
   for each bit group, accessing a respective look up table (LUT) with each respective bit group, each respective LUT having the same priority as the respective bit group which accesses the respective LUT;
   returning a respective partial product from each respective LUT, each respective product representing a compensation value added to the product of said M bit number and the values of said bit group which accesses the respective LUT; and
   adding said partial products to form a final product of said N bit and said M bit numbers, the step of adding including generating a carry, and incrementing a portion of a partial product in accordance with the carry 14. A method for multiplying an N bit number by an M bit number to produce an (N+M) bit product, as in claim 13, wherein:
   said step of adding comprises a plurality of stages, a first stage adds two partial products from adjacent priority LUTs to product a second order partial product, said first stage performs said partial product addition for each pair of adjacent priority partial products in said N bit number, said second order partial products having a priority corresponding to said partial products which are added; and
   subsequent stages add two adjacent priority Lth order partial products to produce an (L+1) order partial product; said subsequent stage performs said Lth order partial product addition for each pair of adjacent priority Lth order partial products from an (L-1) order stage.

15. A method for multiplying an N bit number by an M bit number to produce an (N+M) bit product, comprising the steps of:
   partitioning said N bit number into K non-overlapping bit groups, said K bit groups having a priority corresponding to a significance value of said bits in said N bit number, K-1 of said K bit groups having the same number of bits, a final bit group having a different number of bits from said K-1 bit groups;
   accessing a plurality of respective LUTs, each respective LUT being accessed with a respective one of said K-1 bit groups, each respective LUT having the same priority as the respective bit group which accesses said LUT;
   returning K-1 partial products, one returned partial product from each respective LUT, each partial product representing a compensation value added to the product of said M bit number and the value of the respective bit group which accesses the respective LUT;
   adding said K-1 partial products to form a first output, the step of adding including generating a carry, and incrementing a portion of a partial product in accordance with the carry;
   accessing a final LUT with said final bit group;
   returning a final partial product from said final LUT, said final partial product representing a final compensation value added to the product of said M bit number and the value of said final bit group which accesses said final LUT; and
   adding said final partial product to said first output, the step of adding including generating a carry, and incrementing one of (a) a portion of said final partial product and (b) said first output, in accordance with the carry, to form a product of said N bit and said M bit numbers.

16. A method for multiplying an N bit number by an M bit number to produce an (N+M) bit product, as in claim 15, wherein:
   said K-1 partial product addition comprises a plurality of stages, a first stage adds two partial products from adjacent priority LUTs to produce a second order partial product, said first stage performs said partial product addition for each pair of adjacent priority partial products in said N bit number, said second order partial products having a priority corresponding to said partial products which are added; and subsequent stages add two adjacent priority Lth order partial products to produce an (L+1) order partial product; said subsequent stage performs aid Lth order partial product addition for each pair of adjacent priority Lth order partial products from an (L-1) order stage.

* * * * *

UNITED STATES PATENT AND TRADEMARK OFFICE
CERTIFICATE OF CORRECTION

PATENT NO. : 5,255,216

DATED : Oct. 19, 1993

INVENTOR(S) : W. E. Blanz and C. E. Cox

It is certified that error appears in the above-identified patent and that said Letters Patent is hereby corrected as shown below:

Abstract, line 2, change "O" to --C--.

Abstract, line 18, change "adder" to --adder successively adds--

Figure 4A:
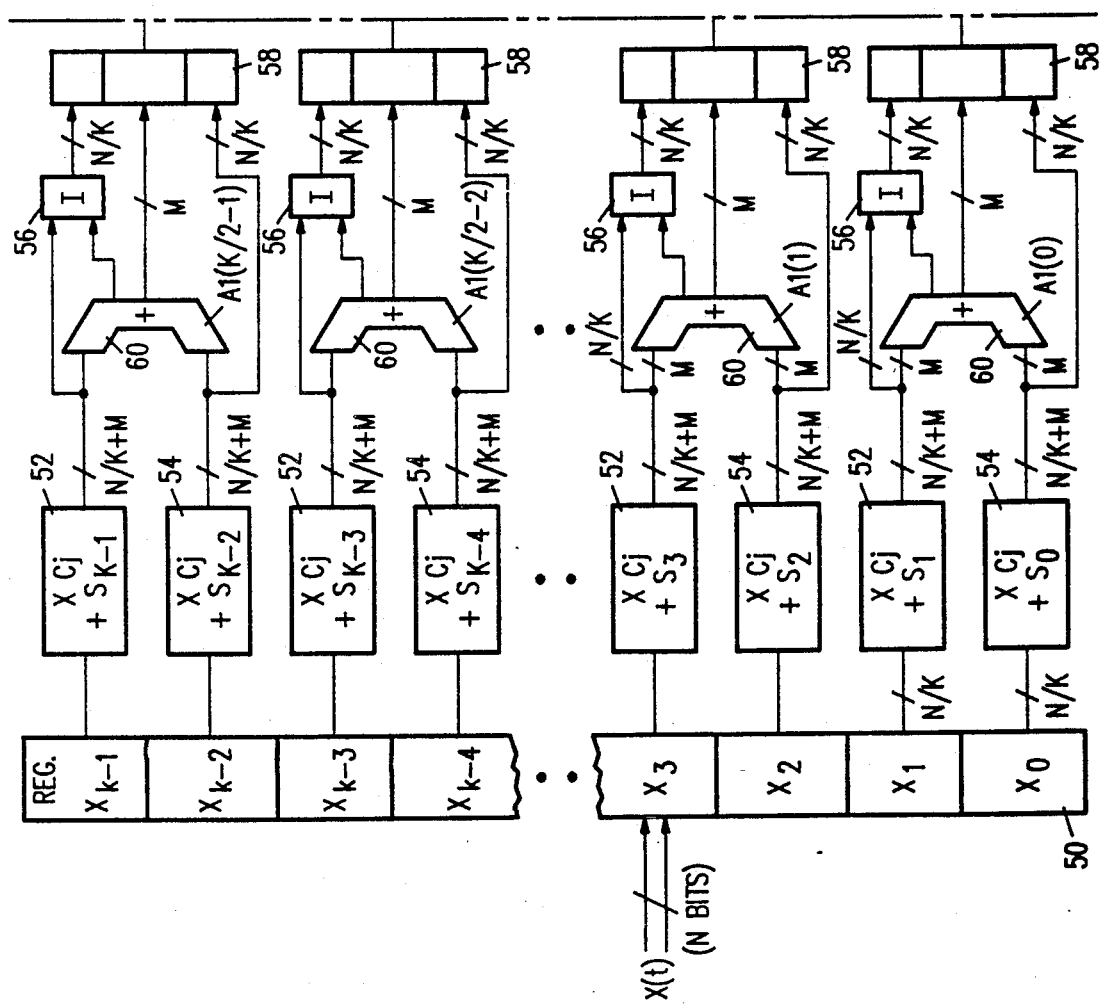
FIG. 4, which comprises FIGS. 4' and 4", illustrates a multiplier for multiplying an N bit number by an M bit number according to the present invention, wherein N is divided into K non-overlapping bit groups.

Col. 3, line 55, change "FIG. 4, which comprises FIGS. 4' and 4'', illustrates" to --FIGs. 4A and 4B illustrate--

Figure 5A:
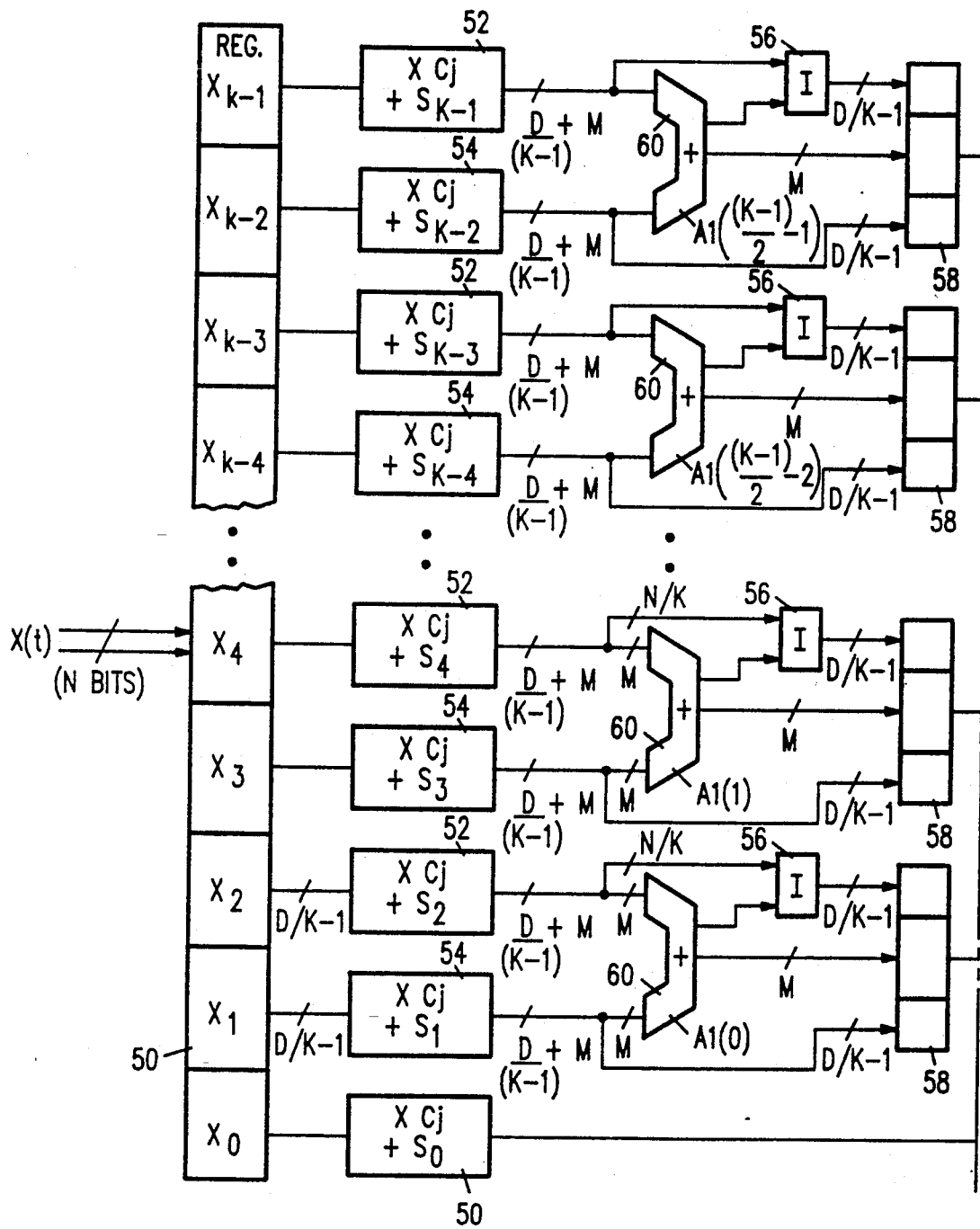
FIG. 5, which comprises FIGS. 5', 5", and 5"', illustrates a multiplier for multiplying an N bit number by an M bit number according to the present invention, wherein one bit group has less bits than the remaining bit groups.
Figure 5B:
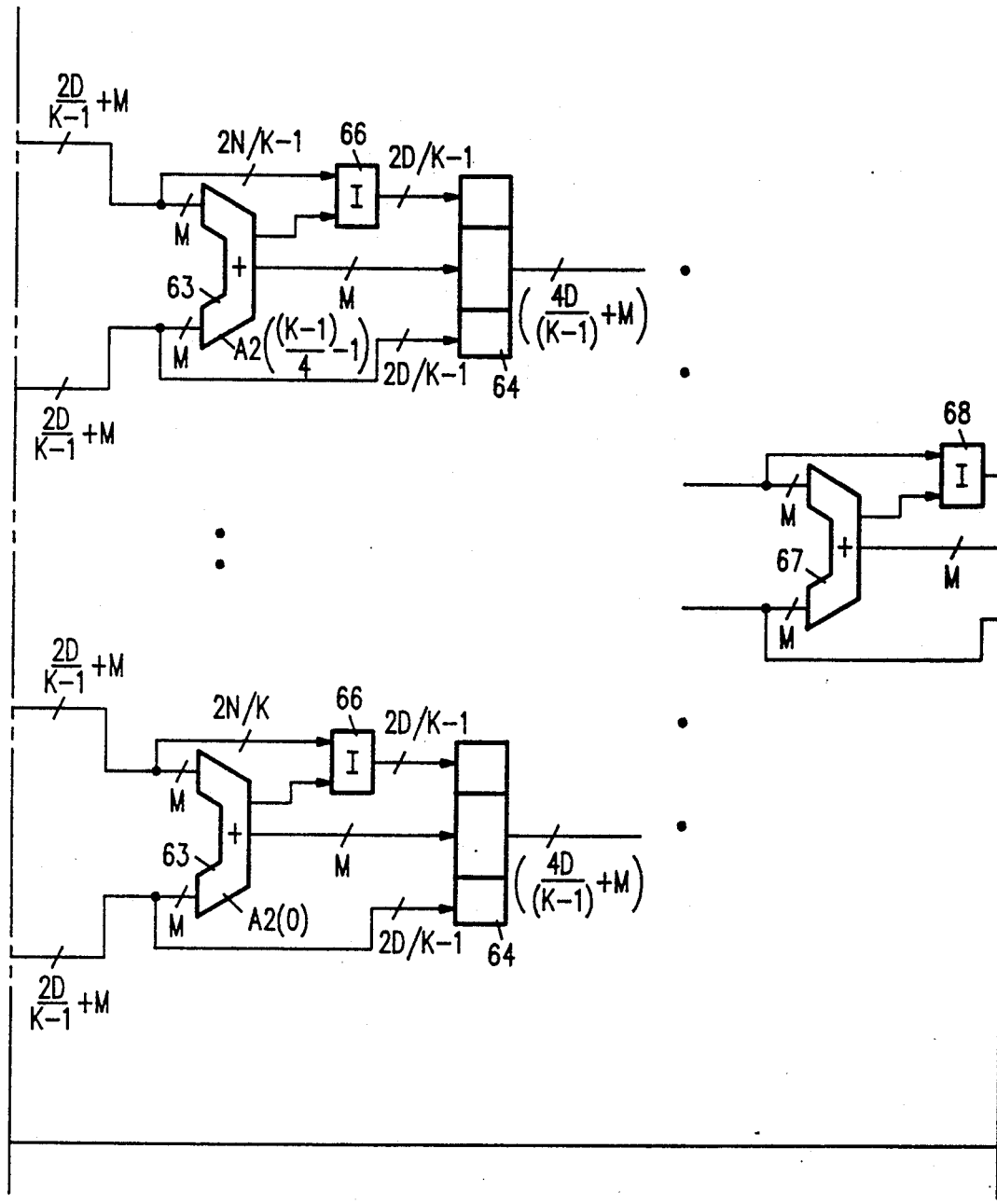
Figure 5C:
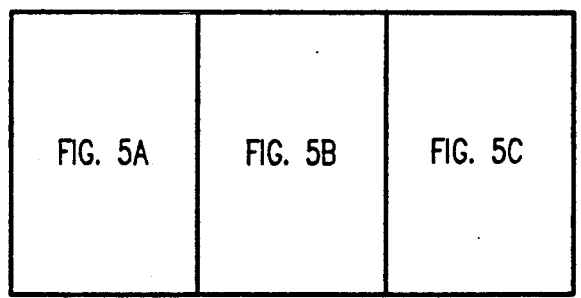
Figure 5C:
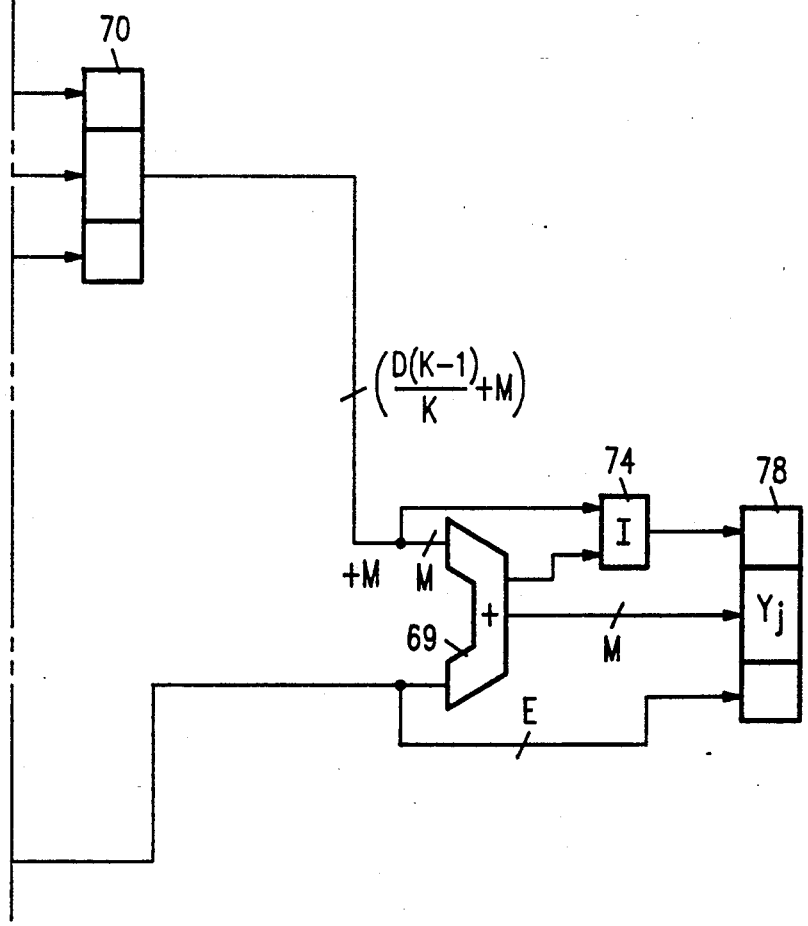

Col. 3, line 59 and 60, change "FIG. 5, which comprises FIGS. 5', 5'', and 5''', illustrates" to --FIGs. 5A, 5B, and 5C illustrate--

Col. 6, line 23, change "FIG. 4" to --FIGs. 4A and 4B--

Col. 9, line 4, change "FIG. 5 illustrates" to --FIGs. 5A, 5B, and 5C illustrate--

Col. 9, line 8 change "FIG. 4" to --FIGs. 4A and 4B--

Col. 12, claim 5, line 11, change ";" to --: and--

Claim 13, Col. 15, line 24, change "carry" to --carry.--

UNITED STATES PATENT AND TRADEMARK OFFICE
CERTIFICATE OF CORRECTION

PATENT NO. : 5,255,216

DATED : Oct. 19, 1993

INVENTOR(S) : W. E. Blanz and C. E. Cox

It is certified that error appears in the above-identified patent and that said Letters Patent is hereby corrected as shown below:

Claim 12, Col. 14, lines 64 to 68 and Col. 15, lines 1 and 2 change

"12. A method for multiplying an N bit number by an M bit, number to produce an (N+M) bit product, as in claim 11, wherein:

said second compensation value equals $2^{(D/2+M-1)}$; and
said third compensation value equals $2^{(E+M-1)}$."

"said second compensation value equals $(2^{((N/2)+M-1)})$."

to (Claim 12 in its entirety)

UNITED STATES PATENT AND TRADEMARK OFFICE
CERTIFICATE OF CORRECTION

PATENT NO. : 5,255,216
DATED : Oct. 19, 1993
INVENTOR(S) : W. E. Blanz and C. E. Cox It is certified that error appears in the above-indentified patent and that said Letters Patent is hereby corrected as shown below:

--12. A method for multiplying an N bit number by an M bit number to produce an (N+M) bit product, as in claim 11, wherein:

said first compensation value equals $-2^{(M-1)}$; and said second compensation value equals $(2^{((N/2)+M-1)})$.--

Signed and Sealed this

Fifth Day of July, 1994

*Attest:*

BRUCE LEHMAN

*Attesting Officer*     *Commissioner of Patents and Trademarks*